Patented Apr. 14, 1936

2,036,994

UNITED STATES PATENT OFFICE 2,036,994

PHOTOGRAPHIC FILM AND METHOD OF TREATING SAME

Donald K. Allison, Beverly Hills, Calif., assignor to Detracolor Ltd., a corporation of Nevada No Drawing. Application February 15, 1935, Serial No. 6,640

13 Claims. (Cl. 95—6)

This application is a continuation in part of my copending application Serial #629,874 filed August 22, 1932, wherein the substance hereof is disclosed but not claimed.

My invention relates broadly to the art of color photography and more particularly to a film or other medium for use in that art which will render a photograph in color upon very simple treatment after exposure. Specifically I employ what may be termed a latent dye, or a leuco base as more generally known to the dye art, in combination with a photographic emulsion or other light sensitive substance suitable for photographic use.

It is an object of my invention to provide a photographic film which can be exposed in the usual way and which will have an invisible or latent dye therein of such a nature that upon subsequent treatment it will assume a predetermined color to give a photograph in that color.

It is further an object of my invention to control the potential color of the photograph by a proper selection of the latent dye or leuco base used in the making of the photographic medium so that it will be possible to secure a photograph in any color desired by using a substantially standard or uniform process of treating the exposed film.

It is also an object of my invention to provide a method of treating an exposed film of the type described so as to bring out the color of the latent dye or leuco base.

It is another object of my invention to provide a film having impregnated therein a leuco base, which said film has not lost any of its photographic sensitivity by reason of the presence of the leuco base.

My invention finds application in both branches of the photographic art, namely, still photography and motion picture photography, and will be found to be equally applicable to both of these branches. It has long been recognized that the coldness of the black and white images obtained by the customary methods of photography employing the usual type of film or plate is not desirable and various remedies for this objection have been proposed and tried. The most common means used for coloring photographs, whether they be from a still camera, or from a motion picture camera, are toning, dyeing and dye-toning, all of which are cumbersome and otherwise rather unsatisfactory from both the artistic and the commercial viewpoint. The advantage of having the coloring medium in the film before exposure is obvious when it is realized that this can be accomplished during the manufacture of the film.

The chief obstacle in color work heretofore, particularly in amateur work, is that the methods of coloring have been so complicated and unstable that it required a highly specialized staff and equipment to operate a given process and even then, uniform results were difficult of attainment. It is therefore an object of my invention to provide a film which can be exposed in the manner now customarily used, and which can then have its latent color brought out by a process so simple and uniform in its operation that anyone familiar with, and equipped to do ordinary developing can treat the film in the course of development so as to bring out a colored image.

These and some of the other objects and advantages of my invention will become apparent from the following detailed description of a preferred form of my invention.

In making a film according to my invention, I find it preferable to mix into the gelatin solution containing a light sensitive salt, such as silver bromide for instance, a solution of a suitable leuco base. The leuco base is chosen according to the color desired and with due regard to availability and cost. If desired the coated film may be soaked in a solution of leuco base to impregnate it sufficiently for satisfactory use, or if preferred the dry leuco base can be mixed in the coating solution. The particular state of the leuco base at the time of using and the exact time of impregnating form no part of my invention, and can be varied at will depending on localized conditions in the production of the finished film ready for exposure.

Broadly speaking all leuco bases of the aniline dyes may be used in the practice of my invention, but I have found that certain of this class of dyes are more satisfactory than others, in that they are more stable. As is well known to the chemical and dye arts aniline dyes may be subdivided into numerous series or families, each of which is again subdivisible into the many dyes commonly known.

One of these groups I have found to be well adapted for use in my invention is the acridine group or series, many of the dyes of which are very stable and otherwise capable of being combined with photographic emulsions for the production of colored pictures.

The fundamental or basic structure of the dyes in this group takes the following form:

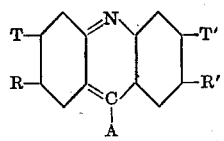

Where T and T' are substituted or unsubstituted amino groups, R and R' are hydrogen, alkyl, alkoxy or hydroxyl groups and A is a hydrogen, aryl or alkyl.

As specific examples of the many acridine dyes whose leuco bases are adapted for use in my invention, the following are given:

2:8 tetramethyldiamino - 5 - phenylacridine, commonly known as acridine orange, 2:8 diamino 3:7 dimethylacridine, known as acridine yellow, and 2:8 tetramethyldiamino 3:7 dimethyl-5-phenylacridine, usually designated as benzo flavine.

After the light sensitive emulsion has been impregnated with a suitable leuco base, say for example, acridine orange, or some other suitable leuco base from the acridine series, the film is exposed in the usual manner. It will be evident that in the operation of my invention the leuco base can be used in either a negative or positive film, or both if desired, in which latter case the negative is treated to bring out its color before it is printed to the positive raw stock. In that the negative is usually used primarily for producing black and white positive prints which are subsequently colored, I will describe my invention as applied to a process which contemplates the production of the usual black and white negative using a standard film with no leuco base therein. This negative after developing, fixing, washing and drying, is then used to print to a positive film which I have impregnated with a leuco base as hereinbefore described. When in this description I use the term expose, it is to be deemed to include exposure of the negative in a camera and also the exposure of the positive stock to the printing light coming to it through the negative, depending on the context of the sentence.

The positive stock, after printing, contains a latent silver image and throughout the emulsion a suitable leuco base. It is then developed in any standard developer such as monomethyl p-aminophenol sulphate, known as "Elon" or hydroquinone, or other suitable substances and given a thorough acid water wash to arrest further development and to wash out surplus developing solution. At this point the film may be then treated with a suitable "fixing solution", although this may not be necessary, depending on the subsequent processing. The film at this stage contains a black silver image which shades down to gray in its lesser densities with clear spaces where no light passed through the negative in printing. The leuco base is still unaffected at this point of the process. The film is now immersed in a solution which will oxidize the free silver to a silver salt which will in turn mordant the leuco base in situ. This oxidation step causes the leuco base to assume its predetermined color.

A solution suitable for oxidizing the leuco base to its color dye form and oxidizing the free silver to a substance which is a mordant for the dye in situ as the color is formed may be made up as follows:

Potassium ferricyanide _____ 5 g.
Chromic acid _____ 1 g.
Copper sulphate _____ 2 g.
Hydrochloric acid (conc.) _____ 5 c. c.
Water to make _____ 1 liter.

I have also found that a solution of chlorine water or bromine water will serve admirably as an oxidizing agent to convert the silver to a salt which will mordant the dye in situ.

The film is now given a thorough water wash to remove excess oxidizer and all dye not mordanted in the images, and is immersed in a fixing solution containing sodium thiosulphate and tannic acid which removes the translucent silver salt by forming a soluble silver complex. The fixing solution is also a mordant for the leuco dye and remordants it in situ, giving a suitably transparent image in color. After another water wash the film is dried and is ready for use.

While I have only described my invention in detail for the production of an image in one color, it will be understood that my invention also comprehends many variations and combinations of this principle and many different dyes, oxidizers and fixing agents may be used without in any way departing from the proper scope of my invention.

For instance, my invention is readily applicable to the so-called bi-pack method of color photography wherein two color selection negatives are secured, say, one recording the blue color values and the other one recording the red color values. These two negatives are by means well known in the art printed in register to opposite sides of a positive having a light sensitive emulsion on each side thereof. One emulsion may have a latent blue dye or leuco base impregnated therein, and the other may have a latent red dye or leuco base impregnated therein. The film is then treated as hereinbefore mentioned for a single emulsion with the result that on one side of the positive a red image is produced and on the opposite side a complementary image in blue is produced, the result being that when projected a two-color picture is thrown on the screen.

These and other variations of my invention which will be evident to those skilled in the art I believe are all within the scope of my invention as defined by the appended claims.

I claim as my invention:

1. In a photographic film the combination of: an emulsion layer carrying a light sensitive silver salt therein; and also carrying throughout its body the leuco base of a dye of the acridine series.

2. In a photographic film the combination of: an emulsion layer carrying a light sensitive silver salt and the leuco base of a dye of the acridine series which dye is of the general structure

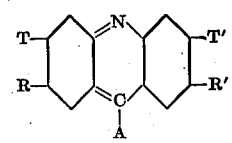

where T, T' and T'' are substituted or unsubstituted amino groups, and R and R' are hydrogen, alkyl, alkoxy or hydroxyl groups and A is a hydrogen, aryl or alkyl.

3. In a photographic film the combination of an emulsion layer carrying a light sensitive silver salt and the leuco base of 2:8 tetramethyldiamino-5-phenylacridine.

4. In a photographic film the combination of an emulsion layer carrying a light sensitive silver salt and the leuco base of 2:8 diamino 3:7 dimethylacridine.

5. In a photographic film the combination of an emulsion layer carrying a light sensitive silver salt and the leuco base of 2:8 tetramethyldiamino 3:7 dimethyl-5-phenylacridine.

6. The method of producing a photograph in color which includes: forming a layer of light sensitive material containing a light sensitive silver salt and the leuco base of an acridine dye; exposing said layer to light; developing the latent silver image formed thereby; and oxidizing said leuco base to its corresponding colored dye form.

7. The method of producing a photograph in color which includes: forming a layer of light sensitive material containing a light sensitive silver salt and the leuco base of an acridine dye; exposing said layer to light; developing the latent silver image formed thereby; oxidizing said leuco base to its corresponding colored dye form and said image to a substance which will mordant said dye; and washing out said dye from the unexposed portions of said film.

8. The method of producing a photograph in color which includes: exposing to light a film having a light sensitive layer thereon containing a light sensitive silver salt and the leuco base of an acridine dye; developing the latent silver image obtained by said exposure; oxidizing said leuco base to its corresponding colored form and said image to a substance which will mordant said dye; and washing out said dye from the unexposed portions of said film.

9. The method of producing a photograph in color which includes: exposing to light a film having a light sensitive layer thereon containing a light sensitive silver salt and the leuco base 2:8 tetramethyldiamino-5-phenylacridine; developing the latent silver image obtained by said exposure; oxidizing said leuco base to its corresponding colored form and said image to a substance which will mordant said dye; and washing out said dye from the unexposed portions of said film.

10. The method of producing a photograph in color which includes: exposing to light a film having a light sensitive layer thereon containing a light sensitive silver salt and the leuco base of 2:8 diamino 3:7 dimethylacridine; developing the latent silver image obtained by said exposure; oxidizing said leuco base to its corresponding colored form and said image to a substance which will mordant said dye; and washing out said dye from the unexposed portions of said film.

11. The method of producing a photograph in color which includes: exposing to light a film having a light sensitive layer thereon containing a light sensitive silver salt and the leuco base of 2:8 tetramethyldiamino 3:7 dimethyl-5-phenylacridine; developing the latent silver image obtained by said exposure; oxidizing said leuco base to its corresponding colored form and said image to a substance which will mordant said dye; and washing out said dye from the unexposed portions of said film.

12. The method of producing a photograph in color which includes: exposing a film having an emulsion layer containing a light sensitive silver salt and the leuco base of an acridine dye therein; developing the latent image thereby obtained; treating said film with an oxidizing solution to change said leuco to its dye form and said image to a mordant for said dye; fixing said image; and washing out the dye in the unexposed portions of said film.

13. The method of producing a photograph in color which includes: exposing a film having an emulsion layer containing a light sensitive silver salt and the leuco base of an acridine dye therein; developing the latent image thereby obtained; treating said film with an oxidizing solution to change said leuco to its dye form and said image to a mordant for said dye; treating said film with a fixing solution which remordants said dye to said image; and washing out the dye in the unexposed portions of said film.

DONALD K. ALLISON.